United States Patent
Wu et al.

(10) Patent No.: US 8,502,782 B2
(45) Date of Patent: Aug. 6, 2013

(54) ELECTRONIC DEVICE FOR ENTERING PASSWORD

(75) Inventors: Yi-Fang Wu, Taipei Hsien (TW); Dan-Feng Wu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 771 days.

(21) Appl. No.: 12/427,920

(22) Filed: Apr. 22, 2009

(65) Prior Publication Data
US 2010/0097320 A1     Apr. 22, 2010

(30) Foreign Application Priority Data
Oct. 22, 2008  (CN) .......................... 2008 1 0305093

(51) Int. Cl.
*G06F 3/02*     (2006.01)
*G06F 12/14*    (2006.01)

(52) U.S. Cl.
USPC .......................................... 345/168; 726/17

(58) Field of Classification Search
None
See application file for complete search history.

(56) References Cited

U.S. PATENT DOCUMENTS

| | | | | |
|---|---|---|---|---|
| 5,559,961 A * | 9/1996 | Blonder | ......................... | 726/18 |
| 5,636,280 A * | 6/1997 | Kelly | ............................ | 713/155 |
| 5,754,652 A * | 5/1998 | Wilfong | ........................ | 713/183 |
| 6,073,237 A * | 6/2000 | Ellison | ......................... | 713/171 |
| 6,631,397 B1 * | 10/2003 | Satomi et al. | ................ | 709/203 |
| 6,996,719 B2 * | 2/2006 | Riordan | ........................ | 713/184 |
| 7,058,613 B1 * | 6/2006 | Sato et al. | ........................ | 705/72 |
| 7,093,298 B2 * | 8/2006 | Rodriquez et al. | ............. | 726/28 |
| 7,113,981 B2 * | 9/2006 | Slate | ............................. | 709/217 |
| 7,289,044 B2 * | 10/2007 | Fux et al. | ........................ | 341/22 |
| 7,386,727 B1 * | 6/2008 | Rover et al. | .................. | 713/176 |
| 7,479,949 B2 * | 1/2009 | Jobs et al. | ...................... | 345/173 |
| 8,111,134 B2 * | 2/2012 | Faith et al. | ...................... | 340/5.81 |
| 8,145,912 B2 * | 3/2012 | McLean | ........................ | 713/182 |
| 8,284,933 B2 * | 10/2012 | Chaisson et al. | ................ | 380/44 |

FOREIGN PATENT DOCUMENTS
EP     0677801 A1    10/1995

* cited by examiner

*Primary Examiner* — K. Wong
(74) *Attorney, Agent, or Firm* — Altis Law Group, Inc.

(57) ABSTRACT

An electronic device includes an access control module, a plurality of input areas, and a comparing module. The access control module has a predetermined password. The input areas are configured to be tapped to input characters in the electronic device. The number of the input areas is determined by the number of unique characters of the predetermined password. The comparing module is configured to compare a sequence of the characters entered with the predetermined password.

18 Claims, 3 Drawing Sheets

ELECTRONIC DEVICE FOR ENTERING PASSWORD

BACKGROUND

1. Technical Field

The present disclosure relates to electronic devices, and particularly to an electronic device for conveniently entering passwords.

2. Description of Related Art

Many electronic devices, such as portable computers and portable telephones, have passwords to prevent malicious use. The password includes alphanumerical characters and/or symbols, and should be correctly entered before the electronic device can be accessed. However, given the number of passwords one has to remember (E-mails, bank accounts, the Internet, laptops, computers, etc), it is too easy to forget the password for a particular function.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
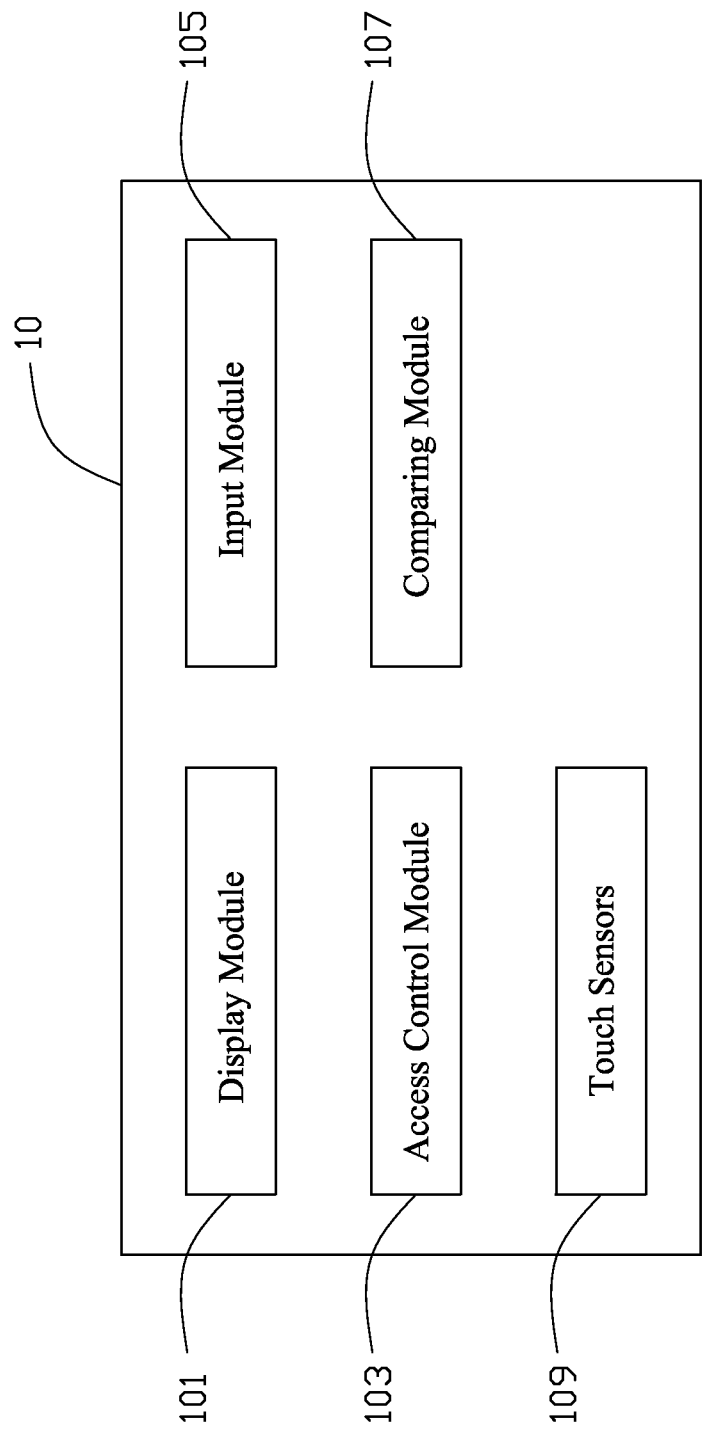
FIG. 1 is a block diagram of an embodiment of an electronic device.

Referring to FIG. 1, an embodiment of an electronic device 10 includes a display module 101, an access control module 103, an input module 105, a comparing module 107, and one or more touch sensors 109.

An access password of the electronic device 10 can be predetermined via the access control module 103. The predetermined password may include alphanumerical characters, and can be inputted via the input module 105 when configuring the password. It is understood that the term alphanumerical is intended to include, but not limited to, all symbols, grammatical or otherwise, that can be entered using a keyboard. The input module 105 may be a keyboard, or a virtual keyboard, or other input devices. The access control module 103 defines a plurality of input areas shown by the display module 101 when prompting for the password. Each of the input areas further uniquely displays a hint of one of the characters. The number of the input areas is equal to the number of the unique characters of the predetermined password. The input areas are configured to be tapped, and send a character input the corresponding character displayed in the input areas to the comparing module 107. Each of the input areas can be tapped at least once. The comparing module 107 is configured to compare a sequence of the characters input from the touch sensors 109 with the predetermined password.

Figure 2:
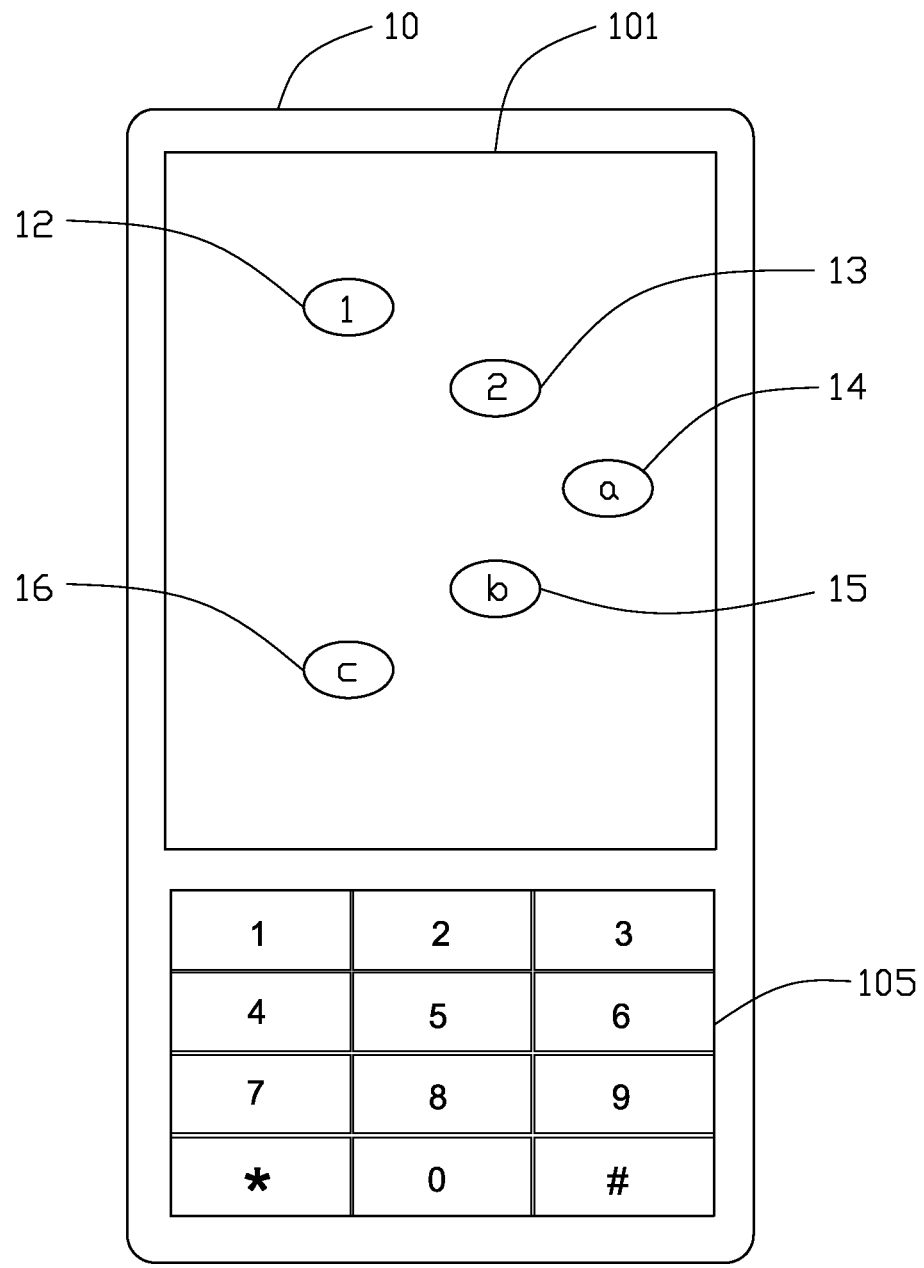
FIG. 2 is a front view of the electronic device of FIG. 1.

Referring also to FIG. 2, in the embodiment, the display module 101 may be a touch screen, and the input module 195 may be a keyboard. The input areas are designated as 12, 13, 14, 15, 16. The predetermined password is for exemplarily purpose, is 1122abc.

Figure 3:
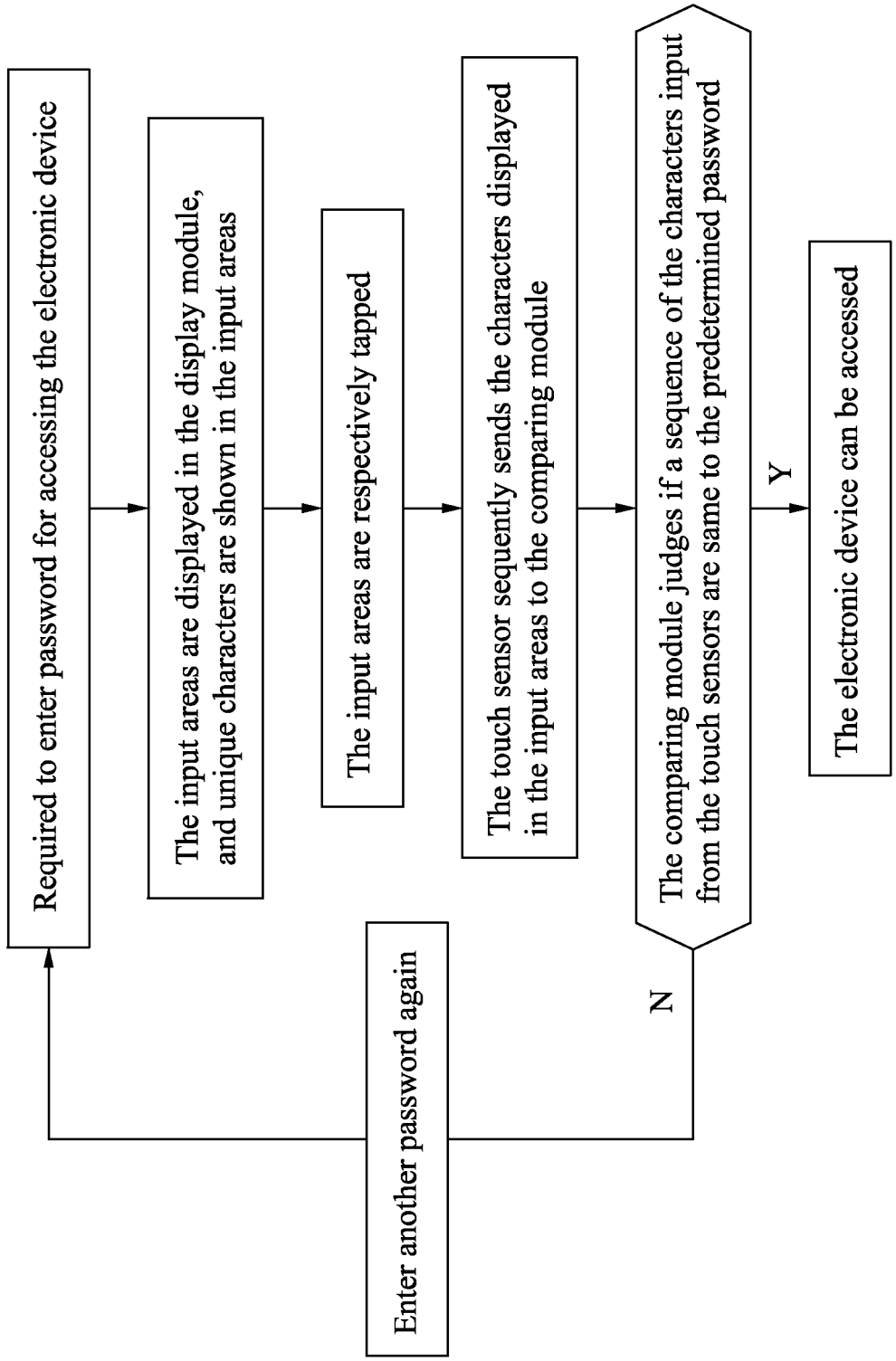
FIG. 3 is a flow chart illustrating an embodiment of a method for entering password in the electronic device of FIG. 1.

Referring also to FIG. 3, when prompting for the password, the input areas 12, 13, 14, 15, 16 are displayed on the display module 101, and correspondingly display the characters 1, 2, a, b, c. The input areas 12, 13, 14, 15, 16 are then tapped. The touch sensors 109, corresponding to the input areas 12, 13, 14, 15, 16, send the character inputs 1, 2, 3, a, b, c displayed in the input areas 12, 13, 14, 15, 16 to the comparing module 107 when tapped. The comparing module 107 receives the characters in the input sequence of the characters by the input areas, and compares the input characters with the predetermined password 1122abc. If the input password matches the predetermined password, the electronic device 10 can be accessed. If the characters are not the same to the predetermined password, the comparing module 107 would signal the display module 101 to prompt for the password again. In order to successfully access the electronic device 10, the number of tapping each input area is equal to the repeat times of each character in the predetermined password, i.e., the input area 12 is tapped twice, the input area 13 is tapped twice, the input area 14 is tapped once, the input area 15 is tapped once, and the input area 16 is tapped once sequentially. The touch sensor 109 sequentially sends the entered characters 1122abc to the comparing module 107. Then the electronic device 10 can be thus accessed after the comparing module 107 verifies that the entered characters match the predetermined password.

It is to be understood, however, that even though numerous characteristics and advantages have been set forth in the foregoing description of embodiments, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An electronic device comprising:
   an access control module having a predetermined password comprising a plurality of characters, and at least two of the plurality of characters are identical in the predetermined password;
   a plurality of input areas configured to be tapped to input characters in the electronic device, the plurality of input areas shown by a display module before inputting a password, the plurality of input areas displaying the plurality of characters before being tapped, and the at least two identical characters displayed in one of plurality of input areas, and the number of the input areas being less than the number of the plurality of characters of the predetermined password; and
   a comparing module configured to compare the password consist of the inputted characters with the predetermined password.

2. The electronic device of claim 1, wherein the number of the input areas is equal to the number of different characters in the predetermined password.

3. The electronic device of claim 2, wherein a plurality of sensors is corresponding to the plurality of input areas and configured to enter the corresponding characters.

4. The electronic device of claim 2, wherein the comparing module is capable of comparing the sequence of tapping each of the input areas with the order of the characters presented in the predetermined password.

5. The electronic device of claim 1, wherein the display module is a touch screen.

6. The electronic device of claim 1, wherein the number of tapping times of all the input areas is more than the number of the plurality of input areas.

7. The electronic device of claim 1, wherein an order of the plurality characters displayed in the plurality of input areas is random.

8. An electronic device comprising:
an access control module having a predetermined password consist of a plurality of characters, and at least two of the plurality of characters are identical in the predetermined password;
a plurality of password input areas shown by a display module, each of the plurality of password input areas displays each different character in the plurality of characters before inputting a password, and the at least two identical characters displayed in one of plurality of input areas; and each of the plurality of password input areas is adapted to be tapped to enter the displayed character in the electronic device; and the number of the plurality of password input areas is determined by the number of the different characters; and
a comparing module capable of comparing the sequence and the number of tapping each of the password input areas with the order of the characters in the predetermined password.

9. The electronic device of claim 8, wherein the number of the password input areas is equal to the number of the plurality of different characters of the plurality of characters.

10. The electronic device of claim 9, wherein the number of tapping times of all the input areas is more than the number of the plurality of input areas.

11. The electronic device of claim 8, wherein a plurality of sensors is corresponding to the plurality of password input areas and configured to enter the corresponding characters when the corresponding password input area is tapped.

12. The electronic device of claim 8, wherein an order of each of the plurality of input areas is random.

13. The electronic device of claim 8, wherein the display module is a touch screen.

14. An electronic device comprising:
an access control module having a predetermined password comprising at least two identical characters and at least one another characters different from the two identical characters;
at least two input areas configured to be tapped to input characters in the electronic device, the plurality of input areas shown by a display module when prompting for a password; the two identical characters displayed in one of the at least two input areas and the another character displayed in the other one of the at least two input areas when prompting for the password;
a plurality of sensors corresponding to the input areas and configured to enter the corresponding characters when the corresponding input area is tapped; and
a comparing module configured to compare the inputted characters input from the sensors with the predetermined password.

15. The electronic device of claim 14, wherein the comparing module is capable of comparing the sequence and a tapping times of tapping each of the input areas with the order of the characters presented in the predetermined password.

16. The electronic device of claim 14, wherein the number of the input areas is equal to the number of different characters of the predetermined password.

17. The electronic device of claim 14, wherein the number of the input areas is less than the number of all characters of the predetermined password.

18. The electronic device of claim 14, wherein an order of the characters displayed in the plurality of input areas is random.

* * * * *